(12) United States Patent
Young et al.

(10) Patent No.: US 7,330,910 B2
(45) Date of Patent: Feb. 12, 2008

(54) FENCING OF RESOURCES ALLOCATED TO NON-COOPERATIVE CLIENT COMPUTERS

(75) Inventors: Jason Christopher Young, Portland, OR (US); Venkateswararao Jujjuri, Beaverton, OR (US); Malahal R. Naineni, Beaverton, OR (US); James John Seeger, Portland, OR (US); Paul A. Dorwin, Beaverton, OR (US); Thomas Keith Clark, Gresham, OR (US); Ninad S. Palsule, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/851,452

(22) Filed: May 20, 2004

(65) Prior Publication Data

US 2005/0273529 A1   Dec. 8, 2005

(51) Int. Cl.
*G06F 3/00* (2006.01)
(52) U.S. Cl. .............................. 710/5; 710/36; 710/56
(58) Field of Classification Search .................... None
See application file for complete search history.

(56) References Cited

U.S. PATENT DOCUMENTS

| 6,052,695 | A | 4/2000 | Abe et al. | |
| 6,212,595 | B1 | 4/2001 | Mendel | |
| 6,226,702 | B1 * | 5/2001 | Yakashiro | 710/107 |
| 6,480,904 | B1 * | 11/2002 | Kato et al. | 710/6 |
| 6,502,192 | B1 * | 12/2002 | Nguyen | 726/4 |
| 6,708,175 | B2 | 3/2004 | Curran et al. | |
| 6,976,186 | B1 * | 12/2005 | Gardner | 714/4 |
| 2002/0091668 | A1 * | 7/2002 | Karasudani | 707/1 |
| 2002/0188590 | A1 * | 12/2002 | Curran et al. | 707/1 |
| 2004/0260861 | A1 * | 12/2004 | Serizawa et al. | 711/4 |
| 2005/0008159 | A1 * | 1/2005 | Grilli et al. | 380/270 |
| 2005/0190795 | A1 * | 9/2005 | Abel et al. | 370/498 |
| 2005/0210275 | A1 * | 9/2005 | Homing et al. | 713/190 |

* cited by examiner

*Primary Examiner*—Kim Huynh
*Assistant Examiner*—Aurangzeb Hassan
(74) *Attorney, Agent, or Firm*—Janaki K. Davda; Konrad Raynes & Victor LLP

(57) ABSTRACT

Techniques are provided for processing an Input/Output (I/O) request. At least one data block is allocated for use in completing the I/O request. A current operations record is stored for the I/O request. It is determined whether the I/O request has been completed within a specified period of time. In response to determining that the I/O request has not been completed within the specified period of time, the allocated at least one data block is fenced.

9 Claims, 5 Drawing Sheets

FENCING OF RESOURCES ALLOCATED TO NON-COOPERATIVE CLIENT COMPUTERS

BACKGROUND

1. Field

Implementations of the invention relate to fencing of resources allocated to non-cooperative client computers.

2. Description of the Related Art

In a distributed Input/Output (I/O) environment, such as a Storage Area Network (SAN), a lock granting server computer may provide distributed locking techniques to enable a client computer to gain exclusive/shared access to data blocks in a storage area. A rogue client may be described as a client computer that has lost connectivity with the lock granting server computer while the client computer holds an exclusive lock to one or more data blocks. The loss of connectivity may occur due to a problem at the client computer (e.g., a problem with a device driver) or due to a problem with the environment (e.g., a problem with the SAN).

For example, a lock granting server computer may give a first client computer an exclusive lock to data blocks to fulfill an I/O request (e.g., a copy operation). If the first client computer does not fulfill the I/O request within a specified period of time, the first client computer is deemed to be a rogue client. The lock granting server computer may then revoke the exclusive lock for the first computer and may allow a second client computer to write to the data blocks. In this case, if the rogue client cannot be contacted by the lock granting server computer, the rogue client may continue to write to the data blocks protected by the exclusive lock, and, thus, may overwrite data that the second client computer has written to the same data blocks.

Conventional systems may provide host-based hardware solutions or storage-based solutions to the rogue client problem. With the host-based hardware solutions, a special processor is installed on the client computer and has access to a network. The lock granting server computer is able to send a message to the processor instructing the processor to power cycle (i.e., shut down) a rogue client. An example of this is an IBM® Remote Supervisor Adapter (RSA) card (available for purchase from International Business Machines, Corporation). With RSA cards, the lock granting server computer and the client computer each have RSA cards that communicate with each other. The lock granting server computer notifies its RSA card to send a signal to the client computer RSA card to shut down the client computer. With host-based hardware solutions, if the rogue client problem occurred due to problems with a device driver at the rogue client, shutting down and restarting the client computer may solve the problem. On the other hand, if the rogue client problem occurred because the client computer was unable to communicate with the server computer due to a SAN failure, then, the hardware-based solutions do not solve the rogue client problem.

With storage-based solutions, high end storage systems support features that allow the lock granting server computer to send the storage system a message instructing the storage system to ignore I/O requests from a specific rogue client. An example of this is dynamic Logical Unit Number (LUN) masking in a SAN. A LUN is a unique number that may identify a specific disk. With dynamic LUN masking, the storage subsystem may be notified to ignore I/O requests from a particular client for a particular LUN. Storage-based solutions address situations in which the rogue client problem occurred due to a SAN failure, but do not address situations in which the rogue client problem occurred due to a failure of a device driver at the client computer.

Thus, notwithstanding existing techniques, there is a continued need in the art to provide better techniques for client computer failure recovery.

SUMMARY OF THE INVENTION

Provided are an article of manufacture, system, and method for processing an Input/Output (I/O) request. At least one data block is allocated for use in completing the I/O request. A current operations record is stored for the I/O request. It is determined whether the I/O request has been completed within a specified period of time. In response to determining that the I/O request has not been completed within the specified period of time, the allocated at least one data block is fenced.

Provided are an article of manufacture, system, and method for processing an Input/Output (I/O) request in which an identification message is received from a client computer. It is determined whether the client computer is a rogue client based on whether a current operations record exists for the client computer.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the invention. It is understood that other implementations may be utilized and structural and operational changes may be made without departing from the scope of the invention.

Figure 1:
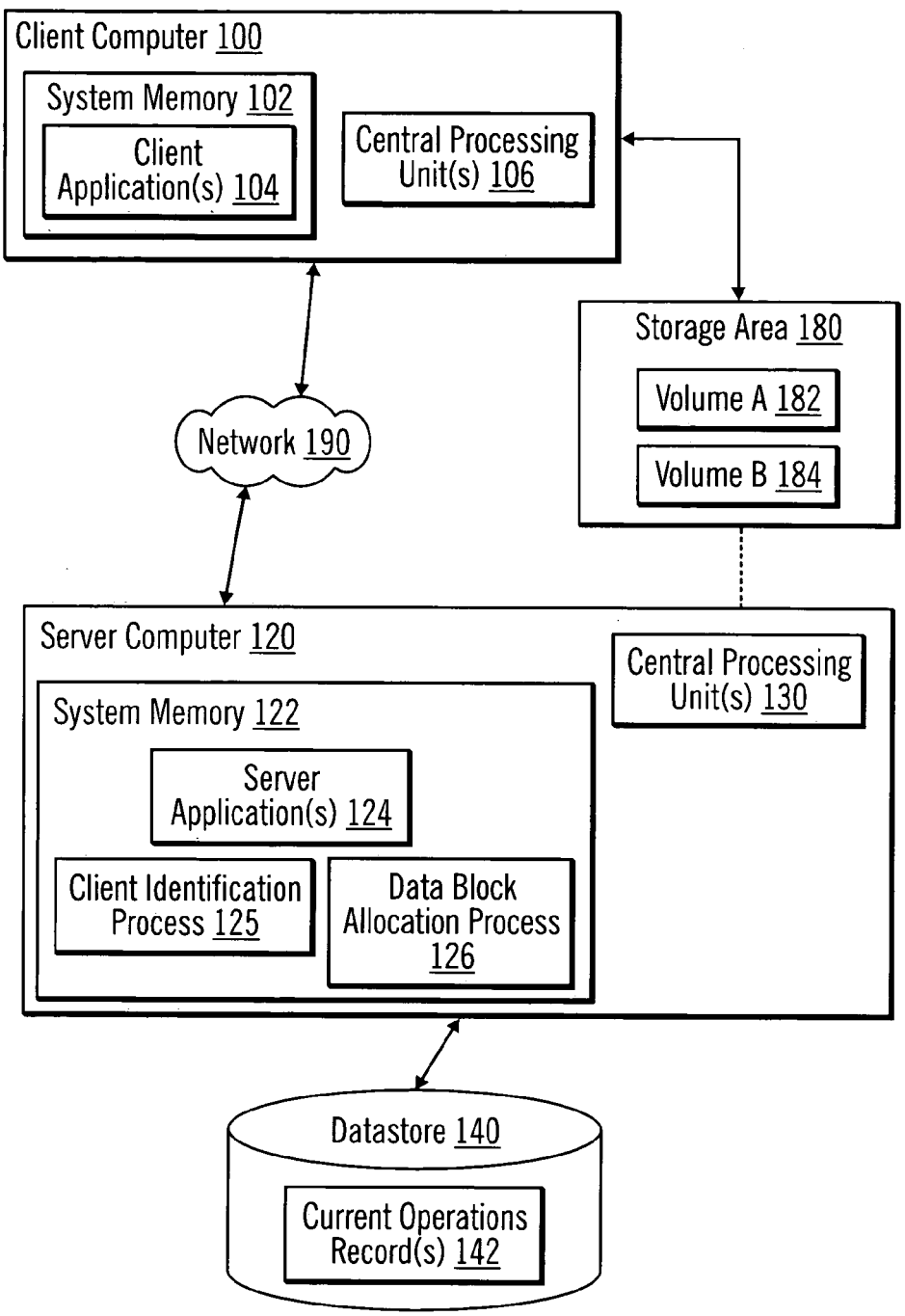
FIG. 1 illustrates a computing environment in accordance with certain implementations of the present invention.

FIG. 1 illustrates a computing environment in accordance with certain implementations of the present invention. A client computer 100 is connected via, for example, a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. When the client computer 100 receives a request to perform a task from the server computer 120, the client computer 100 may be said to be acting as a server computer, while the server computer 120 may be said to be acting as a client computer for the purpose of this request. Regardless of whether the client computer 100 is acting as a client or a server computer, the references herein to "client computer" refer to client computer 100, unless otherwise indicated. Similarly, regardless of whether the server computer 120 is acting as a client or server computer, the references herein to "server computer" refer to server computer 120, unless otherwise indicated.

The client computer 100 includes system memory 102, which may be implemented in volatile and/or non-volatile devices, and one or more Central Processing Units (CPUs) 106. One or more client applications 104 may reside in system memory 102 for execution by a Central Processing Unit (CPU) 106.

The server computer 120 includes system memory 122, which may be implemented in volatile and/or non-volatile devices and one or more Central Processing Units (CPUs) 130. One or more server applications 124, a client identification process 125, and a data block allocation process 126 may reside in system memory 122 for execution by a Central Processing Unit 130. Also, one or more current operations records 142 may reside in a persistent data store 140. In certain implementations, the data store 140 may be part of the storage area 180, and in alternative implementations, the data store 140 may be separate from the storage area 180. The data block allocation process 126 uses the current operations records 142 to later determine whether a client computer 100 has become a rogue client. In certain implementations, the current operations records are maintained for client computers that have been allocated data blocks to complete I/O requests and are kept for rogue clients that have not completed their I/O requests.

The client computer is also connected directly or indirectly (e.g., via a network (not shown)) to a storage area 180. The storage area may include a Storage Area Network (SAN), Direct Access Storage Devices (DASDs), Just a Bunch of Disks (JBOD), Redundant Array of Independent Disks (RAID). The storage area 180 includes data blocks. The data blocks may form multiple volumes, such as Volume A 182 and Volume B 184 (i.e., each volume may include one or more data blocks).

The server computer 120 may either not be physically connected to the storage area 180 or the server computer 120 may be physically connected to the storage area but may be unable to access the storage area 180 (e.g., due to zoning, business policies, etc.).

Figure 2:
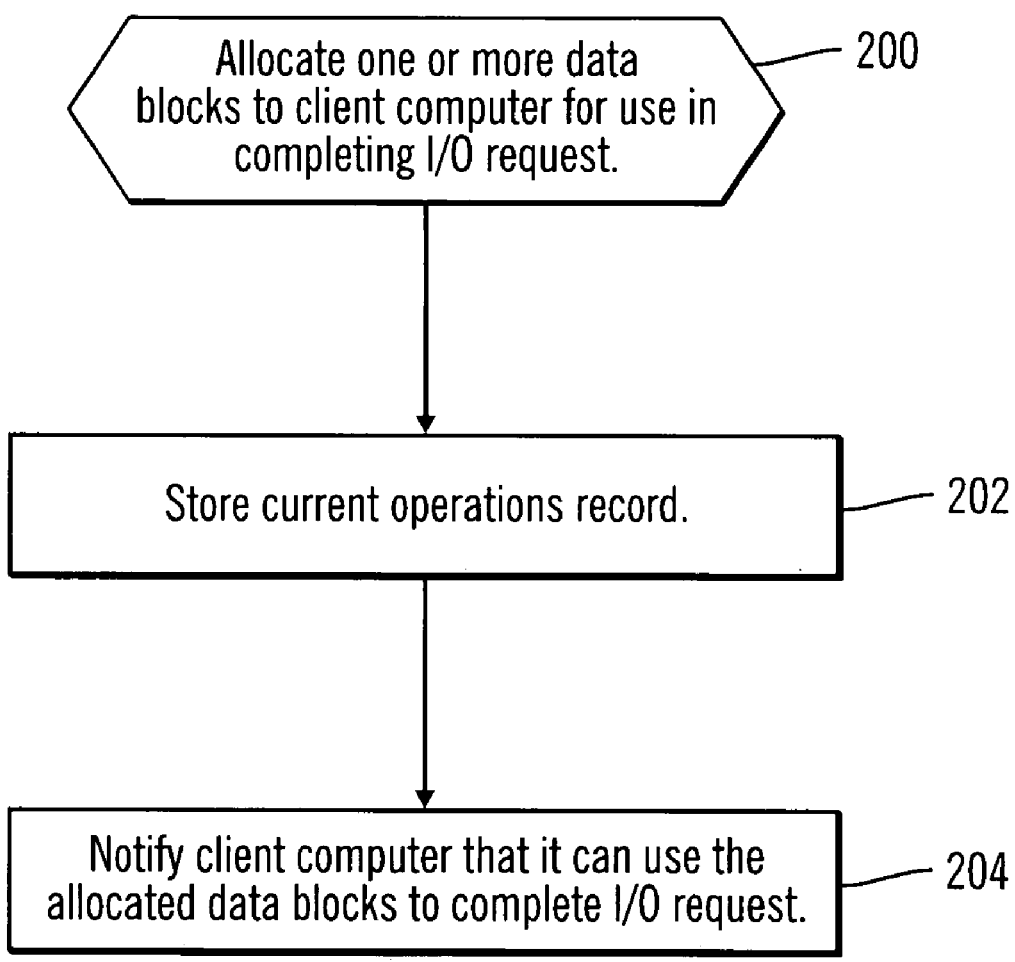
FIG. 2 illustrates logic implemented in a data block allocation process for allocating data blocks in accordance with certain implementations of the present invention.

FIG. 2 illustrates logic implemented in a data block allocation process 126 for allocating data blocks in accordance with certain implementations of the present invention. Control begins at block 200 with the data block allocation process 126 allocating one or more data blocks to the client computer 100 for use in completing an I/O request. For example, the server computer 120 may wish to copy data blocks from Volume A 182 to Volume B 184, but, because the server computer 120 does not have access to storage area 180, the server computer 120 may request the client computer 100 to perform the copy operation. The server computer 120 allocates the data blocks and grants the client computer 100 exclusive access to those data blocks.

In block 202, the data block allocation process 126 stores a current operations record. The current operations record is persistently stored and contains, for example, a persistent name for the client computer 100, addresses of the allocated data blocks, and a timestamp. The data block allocation process 126 then notifies the client computer 100 that the client computer 100 can use the allocated data blocks to complete the I/O request.

Thus, prior to granting a client computer 100 permission to write to a previously unallocated area of storage, the data block allocation process 126 persistently stores a current operations record stating the data blocks it is granting permission to write, the client it is giving permission to write, and a timestamp. The data block allocation process 126 then grants permission to the client computer 100. If at a later time that permission is to be revoked, in certain implementations, a notice is sent to the client computer 100, and, if the client computer 100 does not respond to the notice within a specified period of time, the permission is revoked and the affected data blocks are fenced off by leaving them marked as allocated.

By leaving the blocks marked as allocated, the blocks cannot be reallocated for some other purpose. If they were reallocated, it is possible that the data blocks may be overwritten at a later time by the rogue client, causing data corruption.

The next time the client computer identifies with the data block allocation process 126, the data block allocation process 126 checks to see whether the client computer is considered a rogue client. If so, the data block allocation process 126 sends the client a message to cancel any pending write operations. If a response is successfully received, then the client computer 100 is no longer considered rogue. The data block allocation process 126 removes the current operations records pertaining to the client computer 100 and deallocates the affected data blocks.

Figure 3:
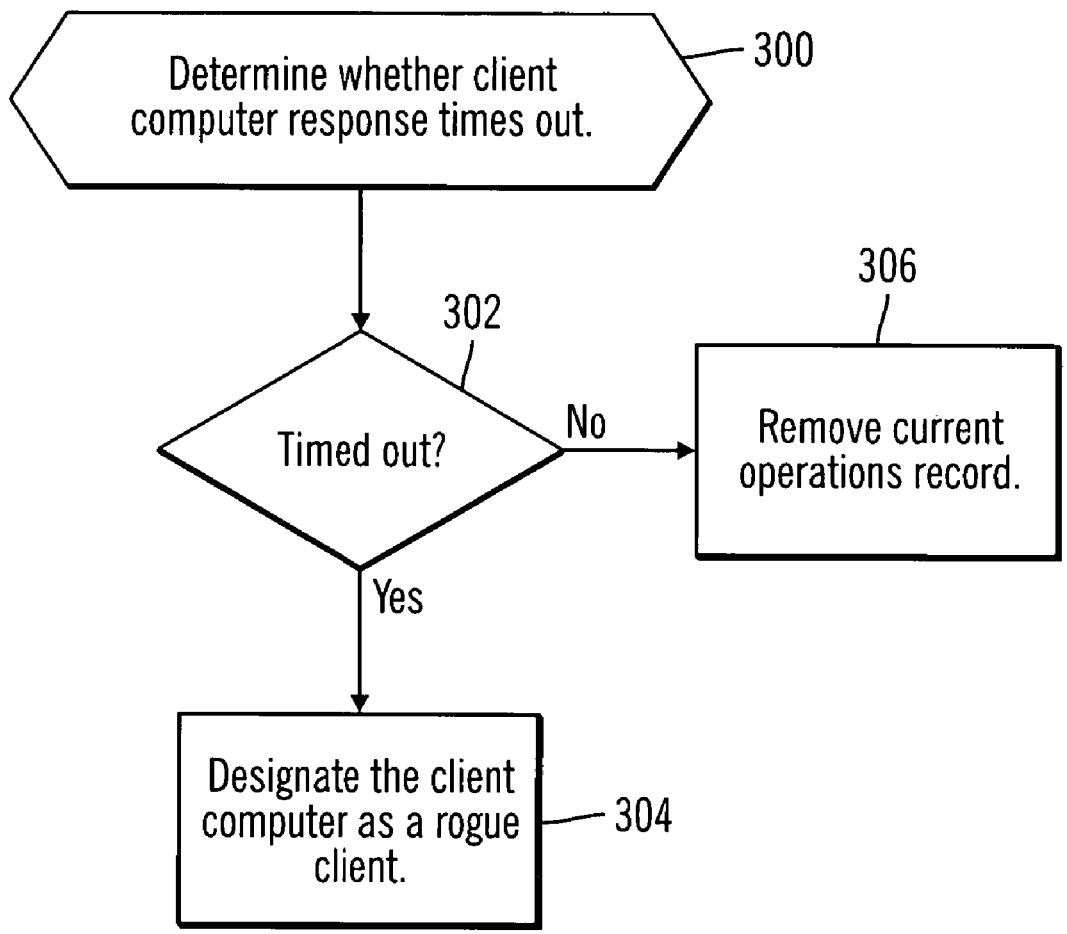
FIG. 3 illustrates logic implemented in a data block allocation process for revoking access to data blocks in accordance with certain implementations of the present invention.

FIG. 3 illustrates logic implemented in a data block allocation process 126 for revoking access to data blocks in accordance with certain implementations of the present invention. Control begins at block 300 with the data block allocation process 126 determining whether the client computer 100 response timed out. That is, the data block allocation process 126 determines whether the client computer 100 completed the I/O request within a specified period of time. Completing the I/O request includes the client computer 100 sending a response to the server computer 120 within the specified period of time. If the server computer 120 does not receive a response within the specified period of time, the server computer 120 conservatively assumes that the I/O request was not completed. From block 302, if the response timed out, processing continues to block 304, otherwise, processing continues to block 306. If the response times out, in block 304, the data block allocation process 126 designates the client computer 100 as a rogue client. This means that the client computer 100 did not complete the I/O request within the specified period of time. If the response does not time out (i.e., the client computer 100 completed the I/O request within the specified period of time), in block 306, the data block allocation process 126 removes the current operations record from storage.

In certain implementations, the data block allocation process 126 sends a notice to the client computer 100 that access to the previously allocated data blocks is being revoked. If the client computer 100 does not respond within a specified period of time to the notice, the data block allocation process 126 declares the client computer 100 to be a rogue client, leaving behind the current operations record that was created for the allocated data blocks.

In certain implementations, the client computer periodically sends a request to the data block allocation process 126 to continue to have access to the allocated data blocks (which request is also referred to as a request to "renew a lease" for the allocated data blocks). If the data block allocation process 126 wants to revoke access to the data blocks, the data block allocation process 126 does not return a message to the client computer 100 that the lease is being renewed. In this manner, the client computer 100 automatically determines that the lease has not been renewed.

Figure 4:
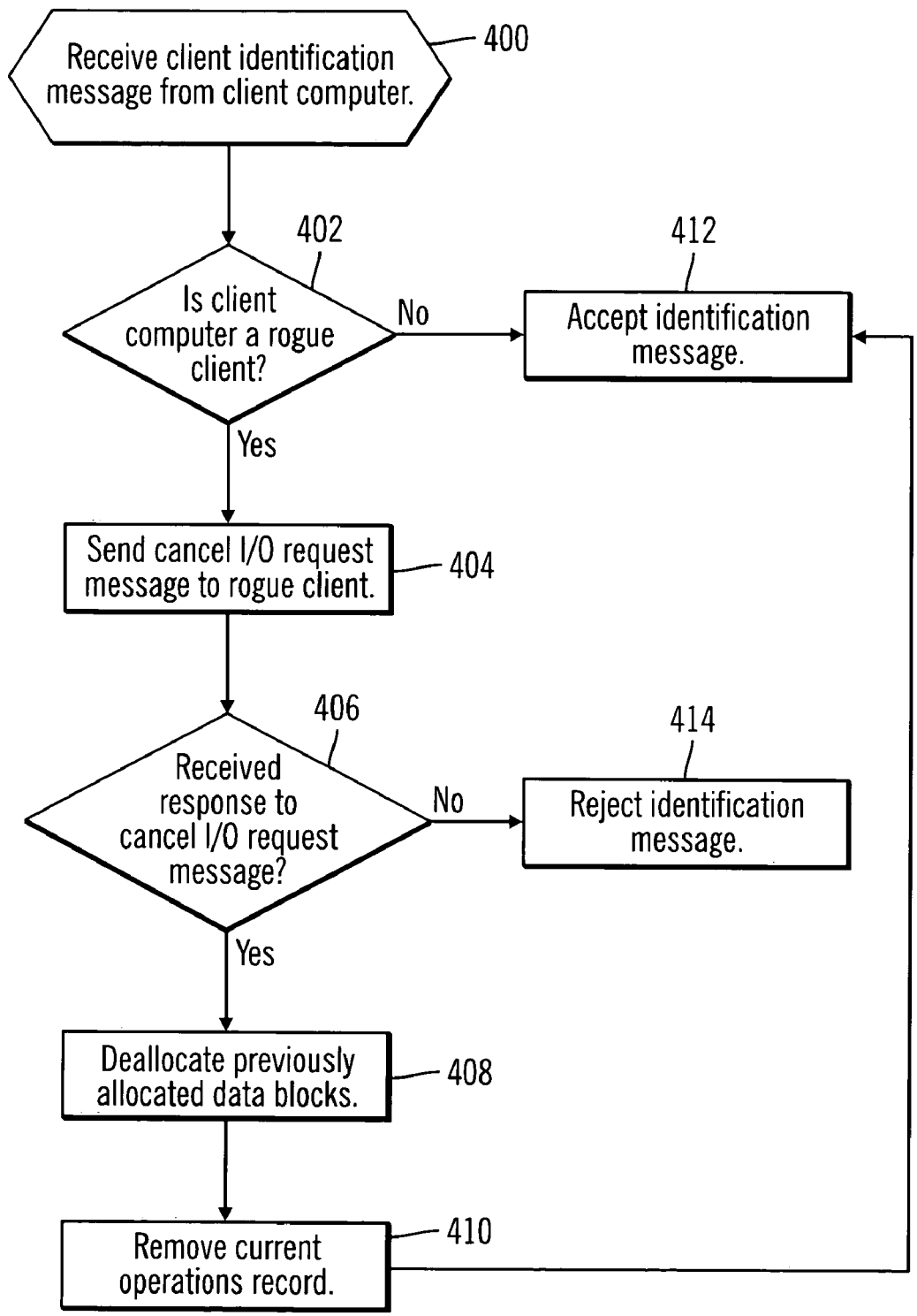
FIG. 4 illustrates logic implemented in a client identification process for client computer identification in accordance with certain implementations of the present invention.

FIG. 4 illustrates logic implemented in a client identification process 125 for client computer identification in accordance with certain implementations of the present invention. Control begins at block 400 with the client identification process 125 receiving a client identification message from the client computer 100. The client computer 100 sends the client identification message to create a connection to the server computer 120 for communicating with the server computer 120. In block 402, the client identification process 125 determines whether the client computer 100 is a rogue client. The determination is made by determining whether a current operations record exists for the client computer 100. If a current operations record exists for a client computer 100 that is attempting to create a new connection with the server computer 120, then the client identification process 125 determines that this client computer 100 did not complete an I/O request during a previous connection, and so the current operations records has been persistently maintained for the client computer 100.

If the client computer 100 is a rogue client, processing continues to block 404, otherwise, processing continues to block 412. In block 404, the client identification process 125 sends a cancel I/O request message to the rogue client. In block 406, the client identification process 125 determines whether a response has been received from the client computer 100 for the cancel I/O request message. If a response has been received, processing continues to block 408, otherwise, processing continues to block 414. In block 408, the client identification process 125 deallocates the data blocks previously allocated to the client computer 100. That is, if the client computer 100 acknowledges the cancel I/O request message, the client identification process 125 recognizes that the data blocks will not be overwritten by the rogue client and is able to allocate them for another operation. In block 410, the client identification process 125 removes the current operations record for the client computer 100. From block 410, processing continues to block 412.

In block 412, the client identification process 125 accepts an identification message from the client computer 100, which enables the client computer 100 to communicate further with the server computer 120.

In block 414, because a response was not received from the rogue client for the cancel I/O request message, the identification message is rejected. Thus, the rogue client cannot communicate with the server computer further until the current operations record for that rogue client has been removed. In certain implementations, the current operations records are periodically removed (e.g., every 24 hours) so that if a rogue client has, for example, a persistent hardware failure or no longer exists, the allocated data blocks may later be reallocated. This typically occurs after some period of time has elapsed since creation of the current operations record (e.g., the current operations record may be removed 24 hours after being created).

Thus, when the client identification process 125 receives an identify request from a client computer, it checks to see if it has a current operations record for that client computer 100. If none exist, the client computer identify request is accepted. If there are one or more current operations records for the client computer, then the client identification process 125 sends a cancel I/O request message to the client computer. If the client computer responds successfully, that means the client computer is no longer performing I/O with those data blocks and it is safe for the data blocks to be reused. In this case, the data blocks are deallocated, the current operations records for the rogue client are removed, and the identify request is accepted.

Implementations of the invention are applicable to various scenarios. Some example scenarios will be described herein merely for illustration, and it is not intended that the implementations be limited to the example scenarios.

In one example scenario, a remote copy of data is performed using a client computer 100 as a proxy. In this case, the server computer 120 desires to copy data from one range of data blocks to another range of data blocks. In cases in which the server computer 120 does not have access to the required Logical Unit Numbers of the data blocks (e.g., due to LUN masking), the server computer 120 instructs a client computer 100 to perform the copy operation.

The data block allocation process 126 at the server computer 120 allocates a target range for the data blocks and stores the name of the client and the target data blocks persistently. The data block allocation process 126 then sends a message to the client computer 100 to copy data from source data blocks to the allocated target data blocks. If the client computer 100 response does not time out, then the I/O request has been successfully completed and the allocated data blocks are not deallocated. If the client computer 100 response times out, then the client computer 100 is considered a rogue client. While the client computer 100 is considered a rogue client, the target data blocks are not used. Once the client computer 100 identifies itself, a cancel message is sent to the client computer 100. If the client computer 100 responds successfully, then the target data blocks are deallocated (i.e., because the copy operation previously failed) and the persistent current operations record is removed.

Certain log-based file systems perform write operations as a new allocation followed by a copy of the data. Therefore, implementations of the invention are applicable to such log-based files systems that allow for distributed I/O.

In a second example scenario, a remote write of data is performed using a client computer 100 as a proxy. In this case, the server computer 120 directs a client computer 100 to write a particular set of data to one or more data blocks. The data block allocation process 126 at the server computer 120 allocates a target range for the data blocks and stores the name of the client computer 100 and the target data blocks persistently. The data block allocation process 126 then sends a message to the client computer 100 to write data to the target data blocks, and the message contains the data to be written. If the client computer 100 response does not time out, then the I/O request has been successfully completed and the allocated data blocks are not deallocated. If the client computer 100 response times out, then the client computer 100 is considered a rogue client. While the client computer 100 is considered a rogue client, the target data blocks are not used. Once the client computer 100 identifies itself, a cancel message is sent to the client computer 100. If the client computer 100 responds successfully, then the target data blocks are deallocated (i.e., because the write operation previously failed) and the persistent current operations record is removed.

In a third example scenario, implementations of the invention may be extended for the case in which the data to be written to a data block is the same (i.e., repeated writes of the data block are idempotent). In this case, implementations deallocate the data blocks after a write times out because a future write to the same block writes the same set of contents.

In the third example scenario, a Logical Unit Number is written to a disk label. The server computer 120 labels a disk by writing a small record at a fixed offset on the disk. The record contains information that uniquely identifies the disk as belonging to the server computer 120. Other client computers and server computers in the distributed I/O environment scan disks they have access to. If the client computer or server computer recognizes the label on the disk as valid, then that computer assumes it can use the disk.

Implementations of the invention enable safely labeling a LUN on a disk label using a client computer 100 as a proxy. If an administrator directs the server computer 120 to write a label to a particular disk, the server computer 120 checks the current operations records to determine whether a label has already been generated for the disk. If a label has not already been generated, the server computer 120 generates a unique label for the disk and stores the label along with the current operations record (e.g., the server computer is storing the disk identifier, unique label, and client name persistently). The server computer 120 then sends a message to the client computer 100 to write the label. If the client computer 100 response times out, the server computer 120 assumes that the write request has failed. However, since the write is idempotent (i.e., the same label will be written by a subsequent write label operation), the server computer 120 allows the same disk to be labeled by another client computer, even while the first client computer is still considered to be a rogue client.

Thus implementations provide distributed failure recovery in a distributed Input/Output (I/O) environment. Certain implementations address a subset of the "rogue" client problem. Implementations of the invention differ from the host-based hardware solutions because the implementations do not require special hardware to be installed on any of the clients. Implementations of the invention differ from the storage-based solutions because the implementations do not depend on having special storage systems.

Certain implementations of the invention address a subset of the rogue client problem for the cases in which the data blocks that are to be allocated were previously unallocated, and, therefore, their previous contents do not matter.

IBM is a registered trademark or common law mark of International Business Machines, Corporation in the United States and/or other countries.

Additional Implementation Details

The described embodiments may be implemented as a method, apparatus or article of manufacture using programming and/or engineering techniques to produce software, firmware, hardware, or any combination thereof. The terms "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The logic of FIGS. 2-4 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2-4 may be implemented in software, hardware, programmable and non-programmable gate array logic or in some combination of hardware, software, or gate array logic.

Also, various processing has been described as possibly occurring within "a specified period of time", but the specified periods of time for various processing may be different. For example, the specified period of time for a client computer 100 to complete an I/O request may be a different amount of time than the specified period of time for the client computer 100 to respond to a notice from the server computer 120.

Figure 5:
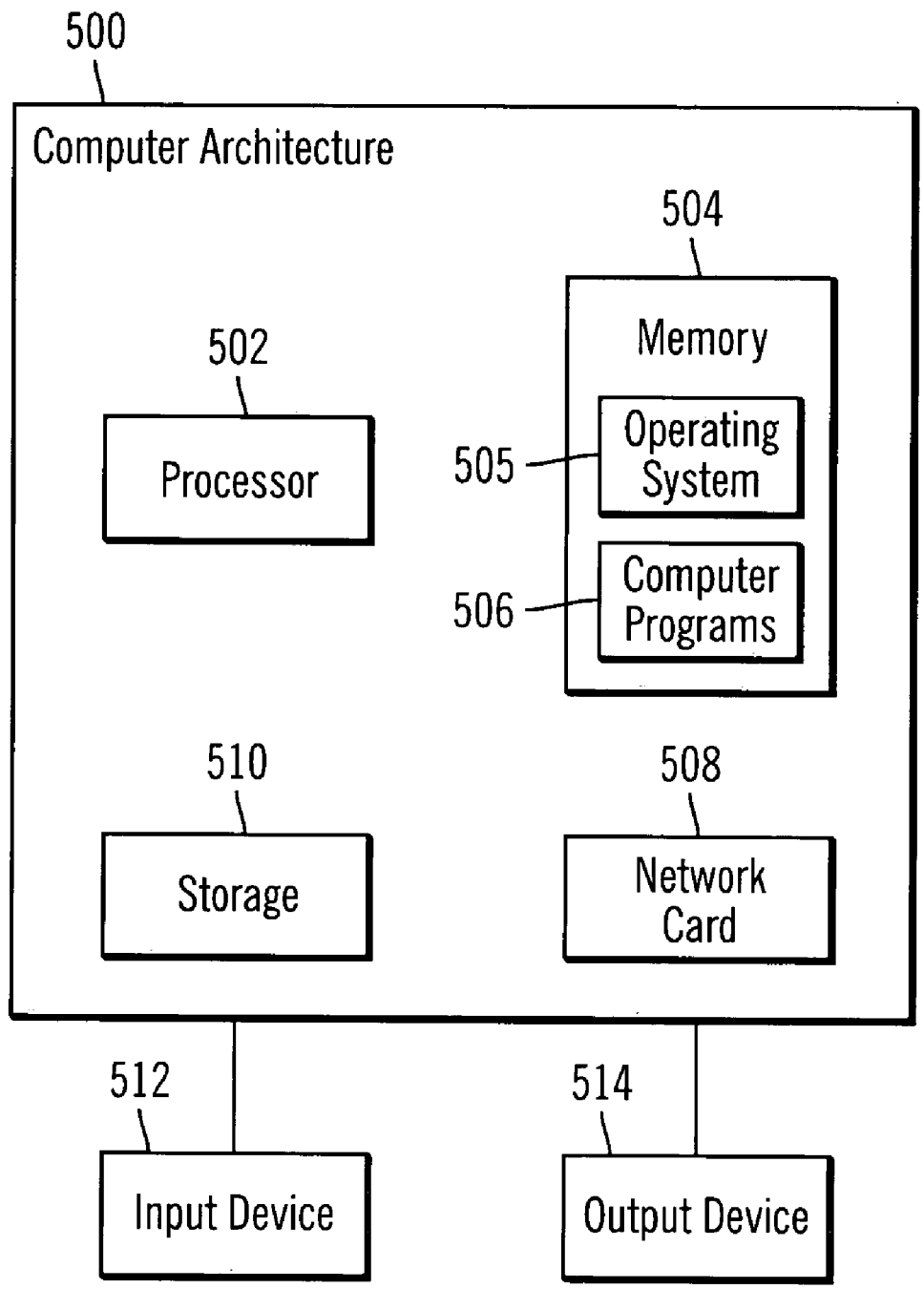
FIG. 5 illustrates an architecture of a computer system that may be used in accordance with certain implementations of the present invention.

FIG. 5 illustrates an architecture of a computer system that may be used in accordance with certain implementations of the present invention. Client computer 100 and/or server computer 120 may implement computer architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for processing an Input/Output (I/O) request, comprising:
    allocating at least one data block for use in completing the I/O request;
    storing a current operations record for the I/O request, wherein the current operations record includes a persistent name for a client computer that has been granted permission to complete the I/O request, addresses of the allocated at least one data block, and a timestamp;
    determining whether the I/O request has been completed within a specified period of time;
    in response to determining that the I/O request has been completed within the specified period of time, removing the current operations record; and
    in response to determining that the I/O request has not been completed within the specified period of time,
        fencing the allocated at least one data block by marking the at least one data block as allocated; and
        keeping the current operations record;
    receiving an identification message from a client computer, wherein the client computer sends the identification message to attempt to create a connection to a server computer; and
    in response to receiving the identification message, determining whether the client computer is a rogue client by determining whether a current operations record exists for the client computer, wherein if a current operations record exists for the client computer that is attempting to create the connection with the server computer, then it is determined that the client computer did not complete an I/O request during a previous connection.

2. The method of claim 1, further comprising:
    notifying a client computer that the client computer is to use the allocated at least one data block to complete the I/O request.

3. The method of claim 1, further comprising:
    in response to determining that the I/O request has not been completed within the specified period of time, determining that a client computer that has been granted permission to complete the I/O request is a rogue client.

4. The method of claim 1, further comprising:
    in response to determining that the client computer is a rogue client,
        sending a cancel I/O request message to the client computer requesting the client computer to cancel a previous client I/O request; and
        determining whether a response was received for the cancel I/O request message.

5. The method of claim 4, further comprising:
    in response to determining that the response was received for the cancel I/O request message,
        deallocating the allocated at least one data block; and
        removing the current operations record for the cancelled I/O request;
        wherein receiving the response indicates that the allocated at least one data block will not be overwritten by the rogue client.

6. The method of claim 4, further comprising:
    in response to determining that the response was not received for the cancel I/O request message, rejecting the identification message.

7. The method of claim 1, further comprising:
    in response to determining that the client computer is not a rogue client, accepting the identification message.

8. The method of claim 1, wherein the I/O request comprises a copy operation.

9. The method of claim 1, wherein the I/O request comprises an idempotent operation.

* * * * *